(12) United States Patent
Mak et al.

(10) Patent No.: US 10,989,469 B2
(45) Date of Patent: Apr. 27, 2021

(54) HEAVY HYDROCARBON REMOVAL FROM LEAN GAS TO LNG LIQUEFACTION

(71) Applicant: Fluor Technologies Corporation, Sugar Land, TX (US)

(72) Inventors: John Mak, Santa Ana, CA (US); Jacob Thomas, Sugar Land, TX (US)

(73) Assignee: Fluor Technologies Corporation, Iriving, TX (US)

(*) Notice: Subject to any disclaimer, the term of this patent is extended or adjusted under 35 U.S.C. 154(b) by 446 days.

(21) Appl. No.: 15/209,015

(22) Filed: Jul. 13, 2016

(65) Prior Publication Data
US 2018/0017319 A1    Jan. 18, 2018

(51) Int. Cl.
*F25J 1/00* (2006.01)
*C10L 3/10* (2006.01)
(Continued)

(52) U.S. Cl.
CPC ........ *F25J 1/0022* (2013.01); *B01D 53/1456* (2013.01); *B01D 53/1462* (2013.01);
(Continued)

(58) Field of Classification Search
CPC .... F25J 1/0022; F25J 2220/60; F25J 2220/66; F25J 2220/68; F25J 2240/40; B01D 53/1456; B01D 53/263; B01D 53/1493; B01D 53/1487; B01D 2252/2023; B01D 2252/2025; B01D 2252/2026; B01D 2252/20452; B01D 2252/20468; C07C 7/005
See application file for complete search history.

(56) References Cited

U.S. PATENT DOCUMENTS

| 2,649,166 A | 8/1953 | Porter et al. |
| 2,926,751 A | 3/1960 | Kohl et al. |

(Continued)

FOREIGN PATENT DOCUMENTS

WO    2011135335 A2    11/2011

OTHER PUBLICATIONS

International Application No. PCT/US2016/042029, International Search Report, dated Jan. 17, 2017, 3 pages.
(Continued)

*Primary Examiner* — Frantz F Jules
*Assistant Examiner* — Webeshet Mengesha
(74) *Attorney, Agent, or Firm* — Conley Rose, PC

(57) ABSTRACT

A system for processing a gas stream can include a physical solvent unit, an acid gas removal unit upstream or downstream of the physical solvent unit, and an LNG liquefaction unit downstream of the acid gas removal unit. The physical solvent unit is configured to receive a feed gas, remove at least a portion of any $C_{5+}$ hydrocarbons in the feed gas stream using a physical solvent, and produce a cleaned gas stream comprising the feed gas stream with the portion of the $C_{5+}$ hydrocarbons removed. The acid gas removal unit is configured to receive the cleaned gas stream, remove at least a portion of any acid gases present in the cleaned gas stream, and produce a treated gas stream. The LNG liquefaction unit is configured to receive the treated gas stream and liquefy at least a portion of the hydrocarbons in the treated gas stream.

20 Claims, 5 Drawing Sheets

(51) Int. Cl.
*B01D 53/14* (2006.01)
*C10L 3/12* (2006.01)
*B01D 53/26* (2006.01)
*B01D 53/64* (2006.01)

(52) U.S. Cl.
CPC ..... *B01D 53/1487* (2013.01); *B01D 53/1493* (2013.01); *C10L 3/101* (2013.01); *C10L 3/102* (2013.01); *C10L 3/106* (2013.01); *C10L 3/12* (2013.01); *B01D 53/1406* (2013.01); *B01D 53/261* (2013.01); *B01D 53/263* (2013.01); *B01D 53/64* (2013.01); *B01D 2252/2023* (2013.01); *B01D 2252/2025* (2013.01); *B01D 2252/2026* (2013.01); *B01D 2252/20421* (2013.01); *B01D 2252/20431* (2013.01); *B01D 2252/20452* (2013.01); *B01D 2252/20468* (2013.01); *B01D 2252/20484* (2013.01); *B01D 2252/20489* (2013.01); *B01D 2253/108* (2013.01); *B01D 2256/24* (2013.01); *B01D 2256/245* (2013.01); *B01D 2257/304* (2013.01); *B01D 2257/504* (2013.01); *B01D 2257/602* (2013.01); *B01D 2257/7022* (2013.01); *B01D 2257/7027* (2013.01); *B01D 2257/80* (2013.01); *C10L 2290/541* (2013.01); *F25J 2220/60* (2013.01); *F25J 2220/64* (2013.01); *F25J 2220/66* (2013.01); *F25J 2220/68* (2013.01); *F25J 2230/30* (2013.01); *F25J 2240/40* (2013.01)

(56) References Cited

U.S. PATENT DOCUMENTS

| | | | |
|---|---|---|---|
| 3,505,784 A | | 4/1970 | Hochgesand et al. |
| 3,773,896 A | | 11/1973 | Preusser et al. |
| 4,150,962 A | * | 4/1979 | Colton ................ B01D 53/14 208/351 |
| 4,545,965 A | * | 10/1985 | Gazzi ................ B01D 53/1468 423/229 |
| 7,442,233 B2 | | 10/2008 | Mitariten |
| 7,597,746 B2 | | 10/2009 | Mak et al. |
| 2005/0268648 A1 | | 12/2005 | Eaton |
| 2011/0067439 A1 | * | 3/2011 | Bridgwood ............ F25J 1/0022 62/606 |
| 2011/0144407 A1 | | 6/2011 | Houtekamer et al. |
| 2012/0079852 A1 | * | 4/2012 | Northrop ................ C07C 7/005 62/620 |
| 2014/0072488 A1 | * | 3/2014 | Cooper ............ B01D 53/1493 423/210 |
| 2015/0166915 A1 | * | 6/2015 | Mak ........................ C10L 3/104 95/94 |
| 2017/0328631 A1 | * | 11/2017 | Kobayashi ............ F25J 1/0022 |

OTHER PUBLICATIONS

International Application No. PCT/US2016/042029, Written Opinion of the International Searching Authority, dated Jan. 17, 2017, 9 pages.

International Preliminary Report on Patentability dated Jan. 24, 2019, International Application No. PCT/US2016/042029, filed Jul. 13, 2016.

* cited by examiner

HEAVY HYDROCARBON REMOVAL FROM LEAN GAS TO LNG LIQUEFACTION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Natural gas is available from conventional natural gas reservoirs and unconventional gas, such as shale gas, tight gas and coal bed methane. Lean natural gas feeds (very high methane content) are becoming more prevalent, especially in many parts of the world including North America, East Africa, and Australia. These feed gases often contain some aromatics and heavy hydrocarbons that freeze out at liquefaction temperature causing plant shutdown and revenue losses. Therefore, these components must be removed prior to liquefaction.

SUMMARY

In an embodiment, a system for processing a gas stream can include a physical solvent unit, an acid gas removal unit downstream of the physical solvent unit, and an LNG liquefaction unit downstream of the acid gas removal unit. The physical solvent unit is configured to receive a feed gas, remove at least a portion of any $C_{5+}$ hydrocarbons in the feed gas stream using a physical solvent, and produce a cleaned gas stream comprising the feed gas stream with the portion of the $C_{5+}$ hydrocarbons removed. The acid gas removal unit is configured to receive the cleaned gas stream, remove at least a portion of any acid gases present in the cleaned gas stream, and produce a treated gas stream. The LNG liquefaction unit is configured to receive the treated gas stream and liquefy at least a portion of the hydrocarbons in the treated gas stream.

In an embodiment, a system for processing a gas stream can include an acid gas removal unit, a physical solvent unit downstream of the acid gas removal unit, and an LNG liquefaction unit downstream of the physical solvent unit. The acid gas removal unit is configured to receive a feed gas stream, remove at least a portion of any acid gases present in the feed gas stream, and produce a cleaned gas stream. The physical solvent unit is configured to receive the cleaned gas stream, remove at least a portion of any $C_{5+}$ hydrocarbons in the cleaned gas stream, and produce a treated gas stream comprising the cleaned gas stream with the portion of the $C_{5+}$ hydrocarbons removed. The LNG liquefaction unit is configured to receive the treated gas stream and liquefy at least a portion of the hydrocarbons in the treated gas stream.

In an embodiment, a method of processing a gas stream can include contacting a gas stream with a physical solvent, wherein the gas stream comprises $C_1$ hydrocarbons, $C_2$ hydrocarbons, $C_3$ hydrocarbons, $C_4$ hydrocarbons, $C_5$ hydrocarbons, $C_{5+}$ hydrocarbons, and acid gas components, removing at least a portion of the $C_{3+}$ hydrocarbons based on the contacting with the physical solvent, contacting the gas stream with a solvent, removing at least a portion of the acid gas components based on the contacting with the physical solvent, and liquefying at least a portion of the gas stream after contacting the gas stream with the physical solvent and the solvent.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
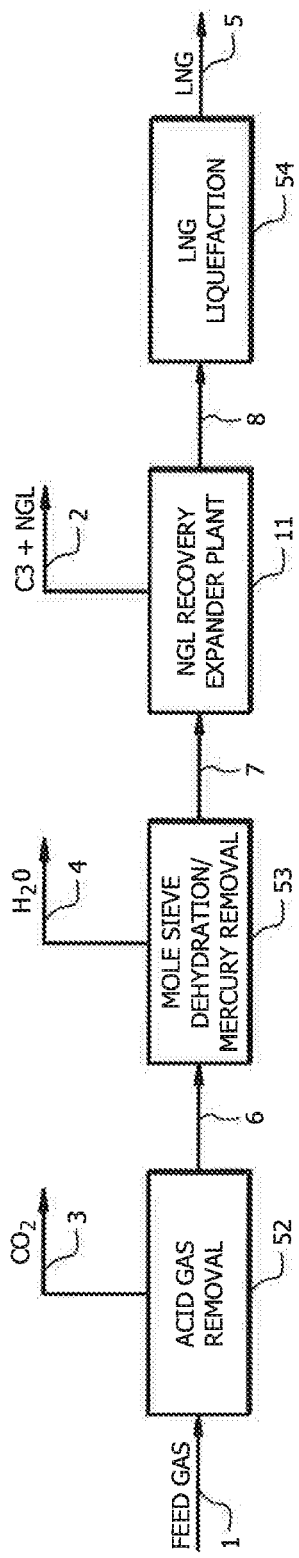
FIG. 1 is an exemplary configuration of an LNG liquefaction plant using NGL recovery with turbo expander for the removal of heavy hydrocarbon and aromatics.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment, and may be included in more than one embodiment of the present systems and methods (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Disclosed herein are systems and methods to reduce the level of heavy hydrocarbons such as aromatics in a lean natural gas feed to an LNG liquefaction plant using a physical solvent in a physical solvent unit. In general, some natural gas reservoirs are naturally lean and contain only small amounts of $C_{2+}$ components. However, a small amount of aromatics (e.g. BTX—Benzene, Toluene, and Xylene) and $C_{5+}$ often remain in the gas. These components must be removed to very low levels (1 ppmv for BTX, 0.1% for $C_{5+}$ and approximately 150 ppmv for $C_{6+}$) to avoid freezing in the liquefaction equipment for typical LNG product specifications.

Pipeline gas is typically processed, as a minimum, to meet the sales gas heating value specifications using cryogenic processing for $C_{3+}$ removal or by mechanical refrigeration for $C_{5+}$ removal. When mechanical refrigeration unit is used, only a portion of the $C_{5+}$ is removed, producing a residue gas that contains $C_{5+}$ hydrocarbons that are higher than feed gas specifications to LNG liquefaction plants, and must be processed in order to avoid freezing in the LNG liquefaction plants.

Table 1 provides an embodiment of a typical pipeline gas composition, and Table 2 shows an exemplary upper limit of the $C_{5+}$ and aromatics components to an LNG liquefaction plant. The allowable limits of heavy hydrocarbons in the LNG plant vary depending on the liquefaction technology and process conditions. In most cases, the heavy hydrocarbons and benzene must be removed to below the concentration shown in Table 2.

TABLE 1

Typical Pipeline Gas Composition

| Component | Mole % |
|---|---|
| $CO_2$ | 2.0001 |
| $H_2S$ | 0.0004 |
| COS | 0.0010 |
| $H_2$ | 0.0100 |
| $N_2$ | 0.2500 |
| AR | 0.0174 |
| $O_2$ | 0.0010 |
| $CH_4$ | 88.4279 |
| $C_2H_6$ | 8.0003 |
| $C_3H_8$ | 0.7788 |
| $N-C_4H_{10}$ | 0.1404 |
| $I-C_4H_{10}$ | 0.1644 |
| $N-C_5H_{12}$ | 0.0390 |
| $I-C_5H_{12}$ | 0.0624 |
| $C_6H_{14}$ | 0.0660 |
| $C_7H_{16}$ | 0.0140 |
| Benzene | 250 ppm |

TABLE 2

Exemplary upper Limit of hydrocarbons to liquefaction plant

| COMPONENT | ppmv |
|---|---|
| $C_{5+}$ | 1000 |
| $C_6$ | 100 |
| $C_7$ | 10 |
| $C_8$ | 1 |
| Benzene | 1 |

There are many technologies that can be used for heavy hydrocarbon removal from natural gas streams. If the gas is rich with a substantial amount of the $C_{3+}$ components, such as gas with propane liquid greater than about 2 to 3 GPM (gallons of propane plus liquid per thousand standard cubic feet of gas), an NGL recovery process can typically be used. NGL can generate more revenue than natural gas on a Btu value basis, and may be economically justified. If NGL recovery cannot be justified, the heavy hydrocarbon content must still need to be removed by chilling and condensing in order to meet the sales gas heating value specifications.

The NGL recovery expander plant application is shown in FIG. 1. Feed gas stream 1, which can be supplied at about 1000 psig, can be treated in an acid gas removal unit 52 for acid gas removal (e.g., $CO_2$, $H_2S$, etc. removal) to meet an inlet gas specification (e.g., in some aspects, an inlet gas specification, such as a 50 ppmv $CO_2$ upper limit) set by an LNG plant 54. The $CO_2$ can be removed as stream 3. The resulting treated stream 6 from the acid gas removal unit 52 can be further processed in the dehydration unit 53 (e.g., a molecular sieve unit, etc.) for water removal to a level below about 0.1 ppmv and/or mercury removal to at or below about 10 nanogram/m³. The water and/or mercury can leave in stream 4. The dried and treated gas in stream 7 can then be processed in the NGL recovery plant 11 to produce the $C_{3+}$ NGL liquid stream 2 and a lean residual gas stream 8 as feed to LNG liquefaction plant 54.

For lean feed gas, (e.g., feed gas with about 2 GPM $C_{3+}$ content), a conventional scrub column can be used. The high pressure feed gas is reduced in pressure to below its critical pressure, in order to operate with the scrub column. The residual gas from the scrub column must be recompressed back to 1000 psig to feed the LNG liquefaction process, which significantly increases the power consumption and reduces liquefaction efficiency of the liquefaction plant. The scrub column process is further illustrated in FIG. 2. In this option, the feed gas stream 1 is treated in the acid gas removal unit 52 and the dehydration and mercury removal unit 53, similar to FIG. 1.

In the scrub column configuration, the treated gas stream 7 from the dehydration and mercury removal unit 53 can be let down in pressure and cooled in a heat exchanger 25 (e.g., a propane chiller) to about −25° F. to form cooled stream 22. The cooled stream 22 can then be fed to a scrub column 21, which can operate at about 600 psig pressure. The scrub column 21 can use propane refrigeration to generate reflux and produce a bottom $C_{3+}$ product stream 29 containing the heavy hydrocarbons and a lean overhead gas stream 28 suitable for the liquefaction plant. The lean overhead gas stream can be recompressed by compressor 26 as required by the liquefaction plant 54.

Figure 2:
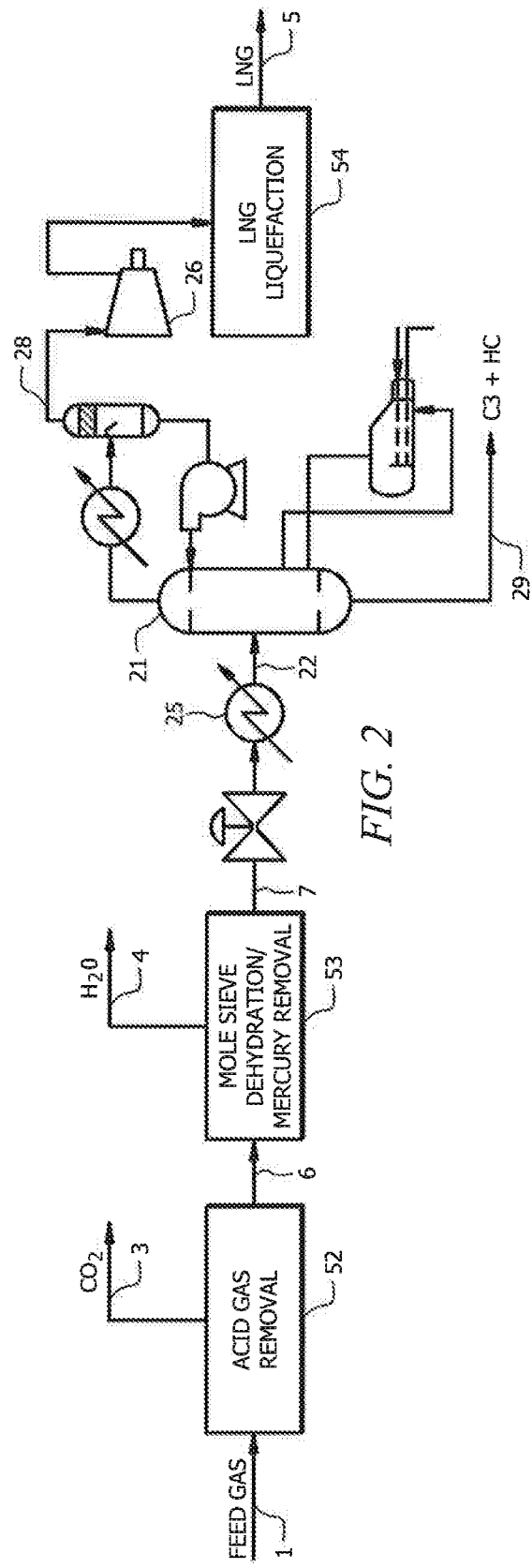
FIG. 2 is an exemplary configuration of an LNG liquefaction plant using a scrub column for the removal of heavy hydrocarbon and aromatics.

The main disadvantage of this configuration shown in FIG. 2 is that high pressure feed gas must be reduced in pressure to operate the scrub column. While the letdown energy can be recovered with the use of a turbo expander, the energy required to recompress the overhead vapor to the liquefaction plant can be significant. On the other hand, if the feed gas is lean, for example, with less than 1 GPM $C_{3+}$ content, the feed gas may not contain sufficient $C_{3+}$ to generate reflux for a stable scrub column operation. Such instability will result in heavy hydrocarbon slippage to the overhead gas resulting in freezing of the liquefaction exchangers.

For very lean gases, especially ones where most of the NGLs have already been extracted from pipeline gas, the primary purpose of the upstream processing unit is the removal of the $C_{5+}$ and aromatic hydrocarbons to prevent freezing in the downstream LNG section. The application of the previous two technologies may not be a cost effective solution.

Figure 3:
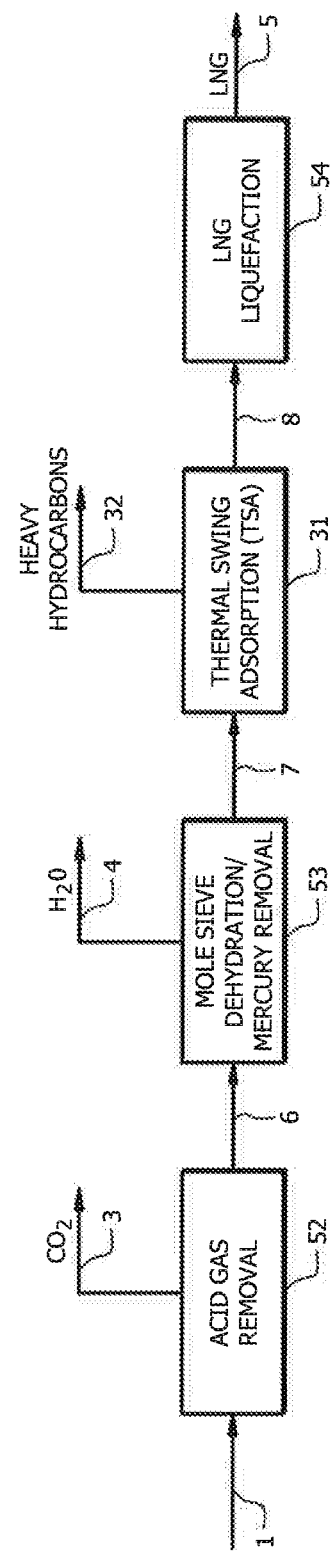
FIG. 3 is an exemplary configuration of an LNG liquefaction plant using the Thermal Swing Adsorption process for the removal of heavy hydrocarbon and aromatics.

Another method to remove heavy hydrocarbons and aromatics from lean gas feed is by the Thermal Swing Adsorption (TSA) process 31 as shown in FIG. 3. TSA operation employs molecular sieves that are specifically designed to remove heavy hydrocarbons and aromatics in a byproduct stream 32. The process operates in a cyclic fashion, similar to the dehydration unit. Unlike other technologies, the adsorption process can be carried out at the feed pressure and has no pressure reduction. The TSA process requires a high temperature—typically around or above 600° F.—for sieve regeneration. The high temperature is problematic with heavy hydrocarbons due to the potential coking problems, especially in the presence of oxygen frequently found in pipeline gas. Fired heater may cause coking or combustion problems at these high temperatures. To operate such system, a fired heater should not be used due to the potential for coking and fouling, and instead, high pressure steam (e.g., 1700 psig steam) or a hot oil system must be made available, which requires additional equipment, and increased capital and operating expenses. In addition, the process also requires propane refrigeration for condensation of the heavy hydrocarbons and subsequent removal from the regeneration gas. While the TSA system can eliminate the recompression requirement, high capital and operating costs and the inherent coking problems are limitations to the use of this process.

All or almost all of these systems and methods suffer from one or more disadvantages. Described herein is a more cost-efficient and effective method for heavy hydrocarbon and benzene removal to lean feed gases to LNG liquefaction plants. Specifically, the present systems and methods are directed to configurations and methods of removal of heavy hydrocarbons and aromatics from a lean feed gas (e.g., feed gas with 1 to 2 GPM or lower $C_{3+}$ liquid content) with the use of a physical solvent. In some aspects, heavy hydrocarbons can be removed from a pipeline lean gas operating at pipeline pressure (e.g., between about 900 psig to about 1500 psig).

Figure 4:
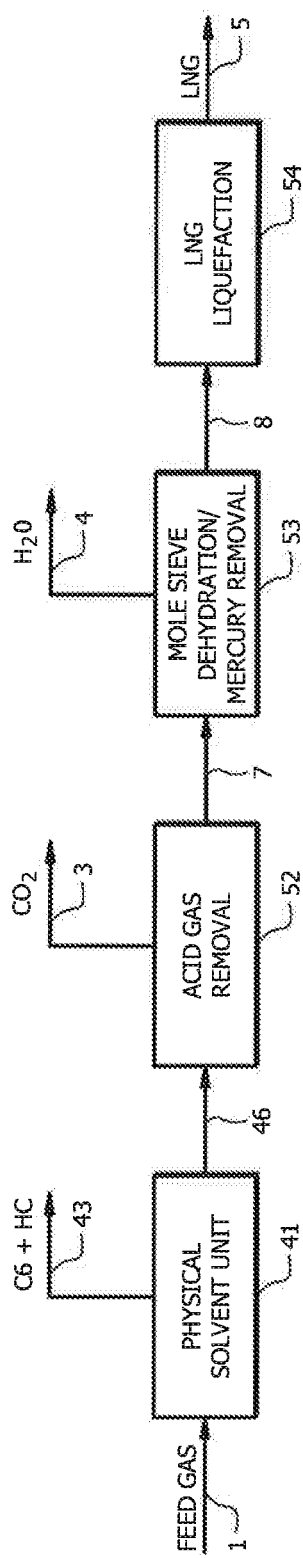
FIG. 4 is an exemplary configuration of an LNG liquefaction plant of using a physical solvent located downstream of the acid gas removal unit for the removal of heavy hydrocarbon and aromatics.

In some aspects, the physical solvent unit 41 can be located upstream of the acid gas removal unit 52 as shown in FIG. 4. As shown in FIG. 4, the feed gas stream 1, which can be supplied at about 1000 psig, can first pass to the physical solvent unit 41. The feed gas stream 1 can comprise any hydrocarbon stream having a heavy hydrocarbon composition above the feed composition limits to the LNG liquefaction plant 54. In some embodiments, the feed gas stream 1 can have a BTX composition above about 1 ppmv, or have a $C_{5+}$ composition above about 0.1%, and/or have a $C_{6+}$ composition above approximately 150 ppmv. In some embodiments, the feed gas can comprise a pipeline gas (e.g., a pipeline gas having a composition as shown in Table 1).

The feed gas stream 1 can pass to the physical solvent unit 41. The physical solvent unit 41 can comprise any unit suitable for contacting a physical solvent with the feed gas stream 1. The physical solvent unit 41 can produce a cleaned gas stream 46 having a reduced heavy hydrocarbon concentration and a heavy hydrocarbon stream 43 with the removed heavy hydrocarbons from the feed gas stream 1 (e.g., having an increased concentration of the heavy hydrocarbons from the feed gas stream 1). Within the physical solvent unit 41, the physical solvent can contact the feed gas stream and extract at least a portion of the heavy hydrocarbons. The contacting can then produce the cleaned gas stream 46 and a rich solvent stream within the physical solvent unit. The resulting rich physical solvent can be treated with low pressure steam and extraction with water to release at least a portion of the extracted heavy hydrocarbons in an extractor, resulting in a the heavy hydrocarbon stream 43 and a lean solvent, which can be recycled for contact with the feed gas stream 1. Excess water can be removed from the regenerator overhead system. The physical solvent unit 41 can operate at approximately ambient, or slightly below ambient, temperatures. For example, an absorber column in the physical solvent unit can operate at a temperature between about 50° F. to about 120° F., or between about 70° F. and about 100° F. Exemplary physical solvent systems are described in more detail herein with respect to FIGS. 6 and 7.

The physical solvent used within the physical solvent unit 41 can comprise any physical solvent having an affinity towards heavy hydrocarbons and aromatics. The physical solvent can comprise DEPG (dimethylether of polyethylene glycol), ethylene carbonate, propylene carbonate, N-methylpyrrolidone, glycol ethers, ethers of polyglycols (e.g., dimethoxytetraethylene glycol), N-substituted morpholine, high molecular weight glycols such as triethylene glycol, isobutylene glycol, and/or mixtures of these physical solvents.

In some aspects, the physical solvent can remove $C_5$ hydrocarbons, $C_6$ hydrocarbons, $C_{7+}$ hydrocarbons, benzene, toluene, and/or xylene. In some aspects, the physical solvent can remove between about 20% and about 40% of the $C_5$ hydrocarbons in the feed gas stream under operating conditions. In some aspects, the physical solvent can remove between about 30% and 70% of the $C_6$ hydrocarbons in the feed gas stream under operating conditions. In some aspects, the physical solvent can remove between about 90% and 99% of the $C_{7+}$ hydrocarbons in the feed gas stream under operating conditions. In some aspects, the physical solvent can remove greater than 90%, greater than 95%, greater than 96%, greater than 97%, greater than 98%, greater than 99%, greater than 99.9%, or greater than 99.99% of the benzene and/or other aromatic hydrocarbons in the feed gas stream 1 under operating conditions.

As shown in FIG. 4, the resulting cleaned gas stream 46 can then pass to the acid gas removal unit 52, which may operate using a tertiary amine (e.g., activated dimethylethanolamine (MDEA)), a primary amine (e.g., DGA), or another suitable solvent. The acid gas removal unit 52 can serve to remove $CO_2$ and $H_2S$ to meet the feed gas $CO_2$ specification for the LNG liquefaction plant (e.g., less than or equal to 50 ppmv $CO_2$). In some aspects, an acid gas removal unit 52 can comprise an absorber and a stripper, where a lean solvent contacts the gas to be treated in the absorber to absorb at least a portion of any acid gases present in the inlet gas stream. The resulting rich solvent can then be regenerated in the stripper using an increased temperature to release the acid gases and produce the lean solvent to be recycled to the absorber. The acid gases can be further processed to comply with emission regulations, using incineration, sulfur recovery, or reinjection to reservoirs.

The solvents used in the acid gas removal unit 52 are chemical reaction based solvent such as activated MDEA, formulated MDEA, MEA and DGA, or other amine solvents that form chemical bonds with acid gases. In all embodiments, the solvent used in the physical solvent unit 41 are based on their affinity towards heavy hydrocarbons (Henry's law of absorption) at operating pressure and there are no chemical reactions. The acid gas removal unit 52 can remove acid gases from the feed gas and produce an acid gas stream 3 that can be processed downstream to comply with emission regulations. The treated gas stream can then pass to the dehydration and mercury removal system 53 for removal of water and mercury, and then to the LNG liquefaction unit 54 as described above with respect to FIGS. 1 and 2. In all embodiments, the acid gas removal unit 52 removes the acid gas content in the feed gas to meet 50 ppmv of $CO_2$ and 4 ppmv$H_2S$ required for LNG production.

As shown in FIG. 4, the physical solvent unit 41 can be placed upstream of the acid gas removal unit 52. When placed upstream of the acid gas removal unit 52, the physical solvent unit 41 can remove the heavy hydrocarbons, such as benzene and other aromatics, and reduce the foaming tendency of the solvent used in the acid gas removal unit 52. This may beneficially reduce or eliminate the operating problems associated with heavy hydrocarbon foaming. Further, the physical solvent used in the physical solvent unit 41 may have a tendency to remove at least a portion of the acid gases in the feed gas stream 1 prior to the cleaned gas in stream 46 passing to the acid gas removal unit 52. For example, in some aspects, between about 10% and about 30% of the acid gases present in the feed gas stream 1 can be removed with the heavy hydrocarbons in stream 43 in the physical solvent unit 41. This may allow the acid gas removal unit 52 to be reduced in size or capacity, thereby reducing the capital costs and operating requirements of the acid gas removal unit 52.

Figure 5:
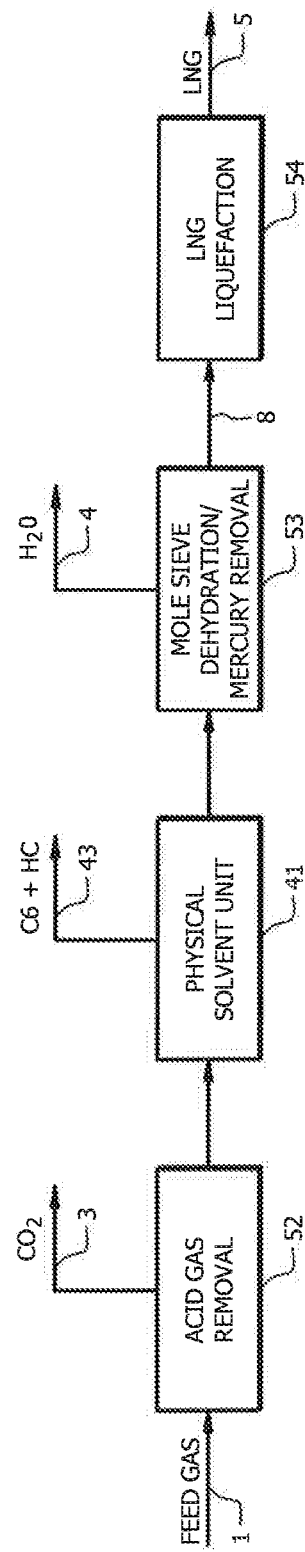
FIG. 5 is an exemplary configuration of an LNG liquefaction plant using a physical solvent located upstream of the acid gas removal unit for the removal of water in addition to heavy hydrocarbon and aromatics.

The location of the physical solvent unit 41 can be upstream or downstream of the acid gas removal unit 52. As shown in FIG. 5, the physical solvent unit 41 can be placed downstream of the acid gas removal unit 52. Each of the units shown in FIG. 5 can perform the same functions and use the same solvents and the like as described with respect to any of the similarly described units in FIGS. 1-4. When placed downstream of the acid gas removal unit 52, the physical solvent unit 41 can remove water in addition to heavy hydrocarbons. In some aspects, the water content of the stream passing from the acid gas removal unit 52 to the physical solvent unit 41 can be reduced to below about 1 lb/MMscf in the physical solvent unit 41. This can reduce the dehydration duty in the dehydration unit 53. In this configuration, the heat exchangers, such as propane chillers, that are used to reduce the water content of the stream passing to the dehydration unit 53 can be downsized or eliminated, which can lower the capital and operating cost of the dehydration unit.

Whether the physical solvent unit 41 is placed upstream or downstream of the acid gas removal unit 52, the use of a physical solvent in the physical solvent unit 41 can be configured to remove heavy hydrocarbons and aromatics to reduce or eliminate the freezing problems in the LNG liquefaction plant 54.

Figure 6:
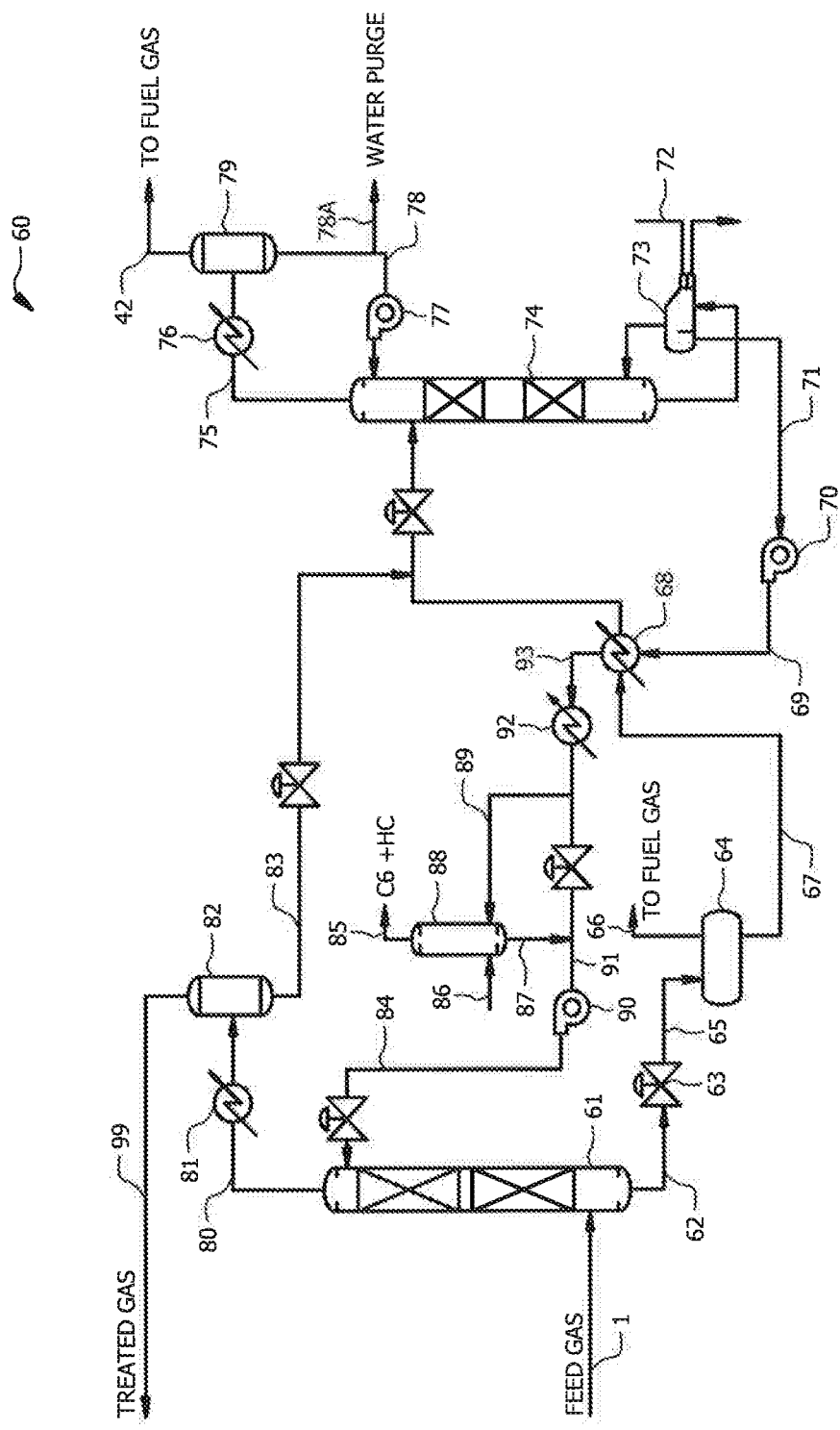
FIG. 6 is a configuration of a physical solvent unit for the removal of heavy hydrocarbon and aromatics.

An exemplary embodiment of a physical solvent unit 60 is shown in FIG. 6. The physical solvent unit 60 shown in FIG. 6 can be used as the physical solvent unit 41 in any of the embodiments of FIG. 4 or 5. As shown in FIG. 6, the feed gas stream 1 can enter the physical solvent unit 60 at a pressure between about 800 psia and about 1,100 psia and at a temperature of between about 90° F. and about 150° F. While the feed gas stream 1 is shown as entering the physical solvent unit 60, the physical solvent unit 60 can also be fluidly coupled downstream of an acid gas removal unit, in which configuration the gas stream entering the physical solvent unit 60 would be the treated gas from the acid gas removal unit (e.g., in the embodiment shown in FIG. 5). The feed gas stream 1 can have any of the compositions described herein including having heavy hydrocarbon composition above the feed specifications for an LNG liquefaction plant. Further, the physical solvent used within the physical solvent unit 60 can comprise any of those physical solvents, or any combination thereof, described herein.

The feed gas stream 1 can pass into a lower portion of an absorber 61, and can be scrubbed with lean solvent 84 entering in an upper portion of the absorber 61. Within the absorber 61, the feed gas 1 can contact the lean solvent 84 and at least a portion of the heavy hydrocarbons, aromatics, and water (and optionally at least a portion of any acid gases, such as $CO_2$ and/or $H_2S$ present in the feed gas stream 1) can be transferred to the lean solvent 84 to produce the rich solvent stream 62 leaving the bottom of the absorber 61.

The treated gas can leave the absorber 61 as overhead stream 80 and be cooled in an optional heat exchanger 81 to form a two-phase stream prior to entering flash drum 82. The treated gas can pass out of the flash drum 82 as overhead stream 99. The treated gas in stream 99 can then pass to any of the downstream units described above, such as the acid gas removal unit (if the physical solvent unit is upstream of the acid gas removal unit), the dehydration unit, and/or the LNG liquefaction plant. A bottoms stream 83 from the flash drum 82 can pass to the inlet to the stripper column 74, for example, by being combined with the rich solvent stream downstream of the heat exchanger 68.

The rich solvent with the absorbed hydrocarbons and aromatics leaves the absorber bottom as rich solvent stream 62 and can be let down in pressure in valve 63 to form a two phase stream 65. Stream 65 can then pass to a rich solvent flash drum 64 operating at between about 80 psi and about 150 psia. The flashed vapor stream 66 from the rich solvent flash drum 64 can be routed to a number of downstream uses, such as a fuel gas recovery system. A flashed liquid stream 67 from the rich solvent flash drum 64 can be heated in the lean/rich heat exchanger 68 to a temperature between about 250° F. and about 300° F. before being fed to the stripper column 74.

The stripper column 74 can produce an overhead vapor 75 that can be at least partially condensed in an ambient cooler 76 and passed to a flash drum 79. A waste gas stream 42 containing the $H_2S$, $CO_2$, hydrocarbons, aromatics and water are removed from the overhead of the flash drum 79. A flashed liquid stream 78 containing mainly water can pass out of the flash drum 79 as the bottoms stream. A first portion of the flashed liquid stream 78 can be pumped by pump 77 as reflux back to the stripper column 74, and excess water can be purged from the stripper column 74 overhead as stream 78a. Removal of water from the feed gas using the physical solvent can be used to produce a dried gas from the absorber 61, which can significantly reduce the dehydration duty in the downstream dehydration unit.

The stripper column 74 can be heated with low pressure steam stream 72 using the bottom reboiler 73. The bottom stream 71 can be at a temperature between about 280° F. and 310° F. and can be pumped by a solvent pump 70 to form stream 69 at a pressure between about 80 psia to about 120 psia and cooled in the lean/rich heat exchanger 68 to form stream 93 at a temperature between about 140° F. and about 180° F. The lean solvent stream 93 can be further cooled in a lean air cooler 92 to a temperature between about 90° F. and about 110° F. to form cooled stream 91 prior to being pumped by pump 90 and recycled back to the absorber 61.

In instances in which the feed gas contains a significant amount of heavy hydrocarbon (e.g. greater than about 0.1 mole %), any excess heavy hydrocarbons in the lean solvent stream 93 can be purged by a slip stream of the lean solvent stream 89 being routed to a hydrocarbon extraction column 88. A water steam 86 can be used as the extraction agent to produce a hydrocarbon overhead stream 85 that can be removed from the circuit to avoid buildup of the hydrocarbons in the loop. When the heavy hydrocarbons in the feed gas are present at a low concentration (e.g. $C_{6+}$ less than 0.01 mole %), the hydrocarbon extractor 88 may not be needed, or if present, not used. The solvent stream 87 can be returned to the solvent system.

Figure 7:
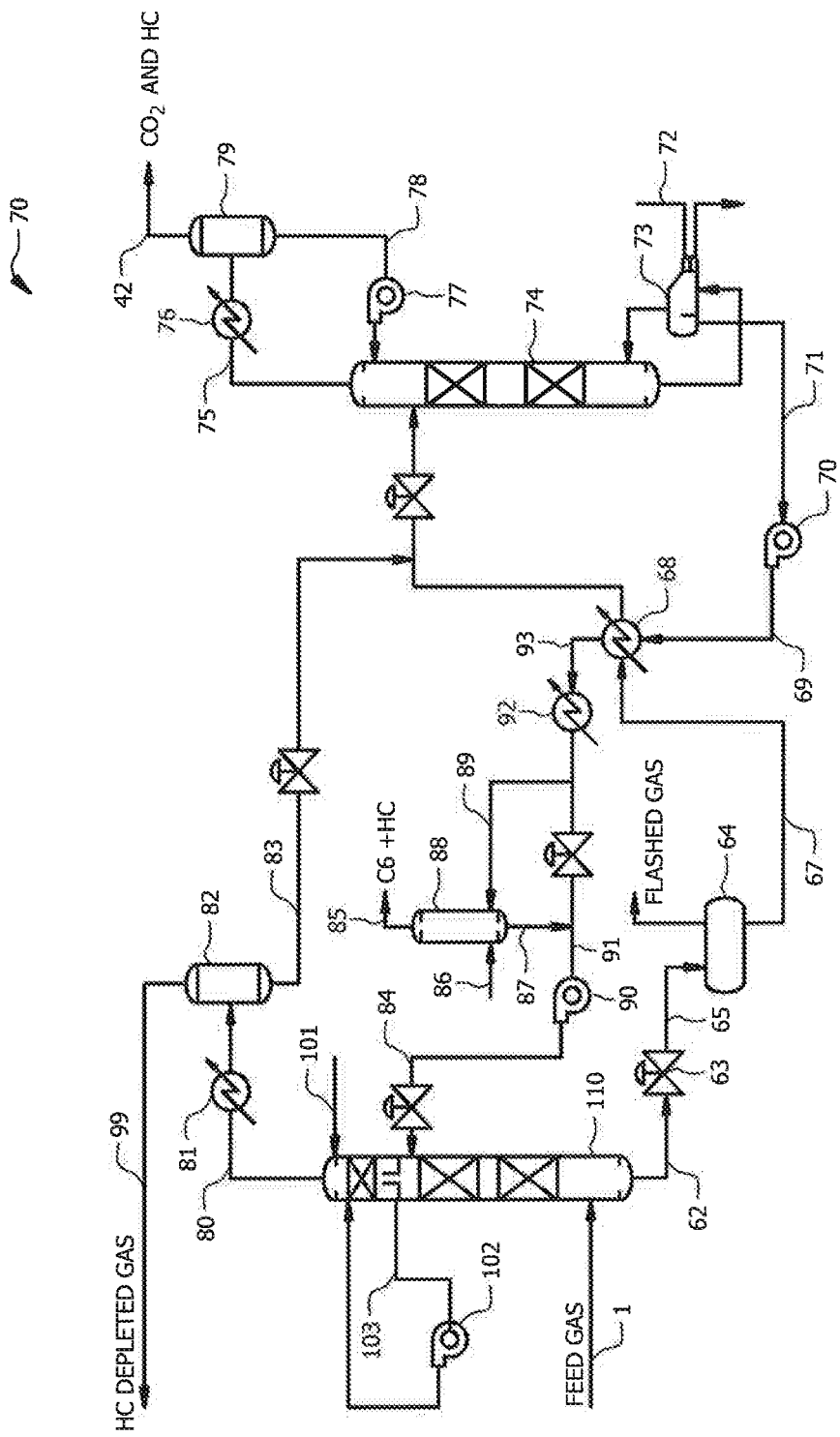
FIG. 7 is another configuration of a physical solvent unit for the removal of heavy hydrocarbon and aromatics.

Another exemplary embodiment of a physical solvent unit 70 is illustrated in FIG. 7. The physical solvent unit 70 is similar to the physical solvent unit 60 described with respect to FIG. 6, and the similar components will not be described in detail in the interest of brevity. The main difference between the physical solvent unit 70 and the physical solvent unit 60 is in the inclusion of a wash section in the upper section of the absorber 110 in the physical solvent unit 70. The wash section can reduce the solvent losses by circulation water using a packed section, while saturating the treated gas with water. Such configuration is especially advantageous when the acid gas removed unit is located downstream (FIG. 4), which can reduce or even eliminate water makeup to the acid gas removal unit. In the physical solvent unit 70, the feed gas stream 1 can enter the absorber 110 and be scrubbed with a lean solvent entering the absorber 110 in stream 84. The treated overhead vapor stream can be further scrubbed with circulating water steam 103 being pumped around using pump 102. A water makeup stream 101 can be added to the top of the absorber 110 as needed for water balance. The rich solvent with the absorbed hydrocarbons and aromatics can pass out of the absorber 110 as the bottoms stream. The remainder of the solvent regeneration loop can be similar to or the same as the solvent regeneration loop described with respect to FIG. 6. The overhead cleaned gas stream 80 can pass out of the absorber 110 as the overhead stream and be processed as described with respect to FIG. 6.

In each configuration of the physical solvent unit, the physical solvent (e.g., any of those described herein) can be used to remove at least a portion of the heavy hydrocarbons from a feed gas stream, acid gases, and optionally water to reduce the load on a downstream acid gas removal system and/or dehydration system.

Example

The disclosure having been generally described, the following examples is given as particular embodiments of the disclosure and to demonstrate the practice and advantages thereof. It is understood that the examples are given by way of illustration and are not intended to limit the specification or the claims in any manner.

A physical solvent unit operation was modeled using Fluor's proprietary simulation software EconoSolv Ver.16 which was developed based on a proprietary data base for the DEPG solvent according to the process flow diagram shown in FIG. 7. The model was conducted using DEPG as the physical solvent and a feed gas composition as shown below in Table 3. The resulting process conditions including the stream compositions of several streams (in mole fractions unless noted otherwise) and the stream conditions (e.g., temperature, pressure, flowrate, etc.) are shown in Table 3.

|  | Stream | | | |
| --- | --- | --- | --- | --- |
|  | Feed Gas (1) | Treated Gas (99) | Flash Gas (42 + 66) | Water Makeup (101) |
| Temperature [F.] | 115 | 112 | 121 | 100 |
| Pressure [psia] | 937 | 932 | 20 | 1,000 |
| Molar Flow [lbmole/hr] | 90,459 | 89,677 | 1,067 | 296 |
| Mass Flow [lb/hr] | 1,646,806 | 1,622,848 | 29,102 | 5,333 |
| Master Comp Mole Frac (CO2) | 0.020098 | 0.018872 | 0.117697 | — |
| Master Comp Mole Frac (H2S) | 0.000004 | 0.000003 | 0.000117 | — |
| Master Comp Mole Frac (COS) | 0.000000 | 0.000000 | 0.000000 | — |
| Master Comp Mole Frac (H2) | 0.000100 | 0.000101 | 0.000011 | — |
| Master Comp Mole Frac (N2) | 0.002512 | 0.002527 | 0.000573 | — |
| Master Comp Mole Frac (AR) | 0.000175 | 0.000176 | 0.000042 | — |
| Master Comp Mole Frac (O2) | 0.000010 | 0.000010 | 0.000003 | — |
| Master Comp Mole Frac (CH4) | 0.884292 | 0.885625 | 0.535851 | — |
| Master Comp Mole Frac (C2H6) | 0.080390 | 0.078896 | 0.184459 | — |
| Master Comp Mole Frac (C3H8) | 0.007828 | 0.007450 | 0.037509 | — |
| Master Comp Mole Frac (N—C4H10) | 0.001407 | 0.001295 | 0.010467 | — |
| Master Comp Mole Frac (I—C4H10) | 0.001648 | 0.001529 | 0.011208 | — |
| Master Comp Mole Frac (N—C5H12) | 0.000372 | 0.000283 | 0.007765 | — |
| Master Comp Mole Frac (I—C5H12) | 0.000623 | 0.000518 | 0.009269 | — |
| Master Comp Mole Frac (C6H14) | 0.000211 | 0.000106 | 0.008955 | — |
| Master Comp Mole Frac (C7H16) | 0.000042 | 0.000006 | 0.003092 | — |
| Master Comp Mole Frac (C8H18) | 0.000012 | 0.000000 | 0.001012 | — |
| Master Comp Mole Frac (C9H20) | 0.000008 | 0.000000 | 0.000681 | — |
| Master Comp Mole Frac (CH3SH) | 0.000000 | 0.000000 | 0.000002 | — |
| Master Comp Mole Frac (BENZENE) | 0.000121 | 0.000000 | 0.010225 | — |
| Master Comp Mole Frac (TOLUENE) | 0.000084 | 0.000003 | 0.006885 | — |

-continued

| | Stream | | | |
|---|---|---|---|---|
| | Feed Gas (1) | Treated Gas (99) | Flash Gas (42 + 66) | Water Makeup (101) |
| Master Comp Mole Frac (M-XYLENE) | 0.000006 | 0.000000 | 0.000483 | — |
| Master Comp Mole Frac (P-XYLENE) | 0.000006 | 0.000000 | 0.000496 | — |
| Master Comp Mole Frac (THIOPHEN) | 0.000000 | 0.000000 | 0.000002 | — |
| Master Comp Mole Frac (WATER) | 0.000050 | 0.002599 | 0.053195 | 1.000000 |

Thus, the model predicts that the physical solvent unit can remove the heavy hydrocarbons to a level suitable to meet the LNG liquefaction plant inlet specifications as well as removing a portion of the acid gases present in the feed stream, which can reduce the load on any downstream acid gas removal unit.

Having described various systems and methods herein, various embodiments can include, but are not limited to:

In a first embodiment, a system for processing a gas stream comprises: a physical solvent unit, wherein the physical solvent unit is configured to receive a feed gas, remove at least a portion of the $C_{5+}$ hydrocarbons and aromatic hydrocarbons in the feed gas stream using a physical solvent, and produce a cleaned gas stream comprising the feed gas stream with the portion of the $C_{5+}$ and aromatic hydrocarbons removed; an acid gas removal unit downstream of the physical solvent unit, wherein the acid gas removal unit is configured to receive the cleaned gas stream, remove at least a portion of any acid gases present in the cleaned gas stream, and produce a treated gas stream; and an LNG liquefaction unit downstream of the acid gas removal unit, wherein the LNG liquefaction unit is configured to receive the treated gas stream and liquefy at least a portion of the hydrocarbons in the treated gas stream.

A second embodiment can include the system of the first embodiment, further comprising: a dehydration unit downstream of the acid gas removal unit and upstream of the LNG liquefaction unit, wherein the dehydration unit is configured to remove at least a portion of the water present in the treated gas stream prior to the treated gas stream passing to the LNG liquefaction unit. A mercury removal unit can also be present to remove almost all of the mercury content in the treated gas.

A third embodiment can include the system of the first or second embodiment, wherein the physical solvent unit is configured to produce the cleaned gas stream having a benzene, toluene, and xylene composition below about 1 ppmv.

A fourth embodiment can include the system of any of the first to third embodiments, wherein the physical solvent unit is configured to produce the cleaned gas stream having a $C_{5+}$ composition below about 0.1% by volume.

A fifth embodiment can include the system of any of the first to fourth embodiments, wherein the physical solvent unit is configured to produce the cleaned gas stream having a $C_{6+}$ composition below about 150 ppmv.

A sixth embodiment can include the system of any of the first to fifth embodiments, further comprising the feed gas, wherein the feed gas has a $C_{3+}$ composition below about 2 to 3 GPM.

A seventh embodiment can include the system of any of the first to sixth embodiments, further comprising the physical solvent, wherein the physical solvent comprises dimethylether of polyethylene glycol, ethylene carbonate, propylene carbonate, N-methylpyrrolidone, glycol ethers, ethers of polyglycols, N-substituted morpholine, or any combination thereof.

An eighth embodiment can include the system of any of the first to seventh embodiments, wherein the physical solvent unit is configured to remove at least a portion of any water present in the feed gas.

A ninth embodiment can include the system of any of the first to eighth embodiments, wherein the physical solvent unit is configured to produce the cleaned gas stream having a water composition at or below about 1 lb/MMscf.

In a tenth embodiment, a system for processing a gas stream comprises: an acid gas removal unit, wherein the acid gas removal unit is configured to receive a feed gas stream, remove at least a portion of any acid gases present in the feed gas stream, and produce a cleaned gas stream; a physical solvent unit downstream of the acid gas removal unit, wherein the physical solvent unit is configured to receive the cleaned gas stream, remove at least a portion of any $C_{5+}$ hydrocarbons in the cleaned gas stream, and produce a treated gas stream comprising the cleaned gas stream with the portion of the $C_{5+}$ hydrocarbons removed; and an LNG liquefaction unit downstream of the physical solvent unit, wherein the LNG liquefaction unit is configured to receive the treated gas stream and liquefy at least a portion of the hydrocarbons in the treated gas stream.

An eleventh embodiment can include the system of the tenth embodiment, further comprising: a dehydration unit downstream of the acid gas removal unit and upstream of the LNG liquefaction unit, wherein the dehydration unit is configured to receive the treated gas stream and remove at least a portion of the water present in the treated gas stream prior to the cleaned gas stream passing to the LNG liquefaction unit.

A twelfth embodiment can include the system of the tenth or eleventh embodiment, wherein the physical solvent unit is configured to produce the cleaned gas stream having a benzene, toluene, and xylene composition below about 1 ppmv.

A thirteenth embodiment can include the system of any of the tenth to twelfth embodiments, wherein the physical solvent unit is configured to produce the cleaned gas stream having a $C_{5+}$ composition below about 0.1% by volume.

A fourteenth embodiment can include the system of any of the tenth to thirteenth embodiments, wherein the physical solvent unit is configured to produce the cleaned gas stream having a $C_{6+}$ composition below about 150 ppmv.

A fifteenth embodiment can include the system of any of the tenth to fourteenth embodiments, further comprising the feed gas, wherein the feed gas has a $C_{2+}$ composition below about 2 to 3 GPM.

A sixteenth embodiment can include the system of any of the tenth to fifteenth embodiments, further comprising the physical solvent, wherein the physical solvent comprises dimethylether of polyethylene glycol, ethylene carbonate, propylene carbonate, N-methylpyrrolidone, glycol ethers, ethers of polyglycols, N-substituted morpholine, or any combination thereof.

A seventeenth embodiment can include the system of any of the tenth to sixteenth embodiments, wherein the physical solvent unit is configured to remove at least a portion of any water present in the feed gas.

An eighteenth embodiment can include the system of any of the tenth to seventeenth embodiments, wherein the physical solvent unit is configured to produce the cleaned gas stream having a water composition at or below about 1 lb/MMscf.

In a nineteenth embodiment, a method of processing a gas stream comprises: contacting a gas stream with a physical solvent, wherein the gas stream comprises $C_1$ hydrocarbons, $C_2$ hydrocarbons, $C_3$ hydrocarbons, $C_4$ hydrocarbons, $C_{5+}$ hydrocarbons, and acid gas components; removing at least a portion of the $C_{5+}$ hydrocarbons based on the contacting with the physical solvent; contacting the gas stream with a solvent; removing at least a portion of the acid gas components based on the contacting with the physical solvent; and liquefying at least a portion of the gas stream after contacting the gas stream with the physical solvent and the solvent.

A twentieth embodiment can include the method of the nineteenth embodiment, wherein the gas stream further comprises water, and wherein the method further comprises: removing at least a portion of the water in the gas stream prior to liquefying at least the portion of the gas stream.

A twenty first embodiment can include the method of the twentieth embodiment, wherein removing at least the portion of the water in the gas stream occurs in response to contacting the gas stream with the physical solvent.

A twenty second embodiment can include the method of the twenty first embodiment, wherein removing at least the portion of the water in the gas stream reduces the water in the gas stream to at or below about 1 to about 3 lb/MMscf.

A twenty third embodiment can include the method of the twenty second embodiment, wherein removing at least the portion of the water in the gas stream occurs in a dehydration unit.

A twenty fourth embodiment can include the method of any of the nineteenth to twenty third embodiments, wherein contacting the gas stream with the physical solvent further removes at least a portion of the acid gas components.

A twenty fifth embodiment can include the method of any of the nineteenth to twenty fourth embodiments, wherein removing at least the portion of the $C_{5+}$ hydrocarbons reduces a concentration of benzene, toluene, and xylene in the gas stream to at or below about 1 ppmv.

A twenty sixth embodiment can include the method of any of the nineteenth to twenty fifth embodiments, wherein removing at least the portion of the $C_{5+}$ hydrocarbons reduces a concentration of $C_{5+}$ components in the gas stream to at or below about 0.1% by volume.

A twenty seventh embodiment can include the method of any of the nineteenth to twenty sixth embodiments, wherein removing at least the portion of the $C_{5+}$ hydrocarbons reduces a concentration of $C_{6+}$ components in the gas stream to at or below about 150 ppmv.

A twenty eighth embodiment can include the method of any of the nineteenth to twenty seventh embodiments, wherein the gas stream has a $C_{2+}$ composition below 3 GPM prior to being contacted with the physical solvent or the solvent.

A twenty ninth embodiment can include the method of any of the nineteenth to twenty eighth embodiments, wherein the physical solvent comprises dimethylether of polyethylene glycol, ethylene carbonate, propylene carbonate, N-methylpyrrolidone, glycol ethers, ethers of polyglycols, N-substituted morpholine, or any combination thereof.

A thirtieth embodiment can include the method of any of the nineteenth to twenty ninth embodiments, wherein contacting the gas stream with the physical solvent and contacting the gas stream with the solvent occurs at a pressure between about 900 psig and about 1500 psig.

A thirty first embodiment can include the method of any of the nineteenth to thirtieth embodiments, wherein contacting the gas stream with the physical solvent removes between about 20% and about 40% of the $C_5$ hydrocarbons in the gas stream being contacted with the physical solvent.

A thirty second embodiment can include the method of any of the nineteenth to thirty first embodiments, wherein contacting the gas stream with the physical solvent removes between about 30% and 70% of the $C_6$ hydrocarbons in the gas stream being contacted with the physical solvent.

A thirty third embodiment can include the method of any of the nineteenth to thirty second embodiments, wherein contacting the gas stream with the physical solvent removes between about 90% and 99% of the $C_{7+}$ hydrocarbons in the gas stream being contacted with the physical solvent.

A thirty fourth embodiment can include the method of any of the nineteenth to thirty third embodiments, wherein contacting the gas stream with the physical solvent removes greater than 90% of the aromatic hydrocarbons in the gas stream being contacted with the physical solvent.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of processing a feed gas stream, the method comprising:
    contacting, in an acid gas removal unit configured for removal of acid gases from the feed gas stream, the feed gas stream with an acid gas removal solvent, wherein the feed gas stream comprises $C_1$ hydrocarbons, $C_2$ hydrocarbons, $C_3$ hydrocarbons, $C_4$ hydrocarbons, $C_{5+}$ hydrocarbons, and acid gas components;
    removing at least a portion of the acid gas components from the feed gas stream based on the contacting with the acid gas removal solvent to form a first treated gas stream;
    contacting, in a physical solvent unit configured for removal of $C_{3+}$ hydrocarbons from the first treated gas stream, the first treated gas stream with a physical solvent and then with water, wherein the first treated gas stream comprises the $C_1$ hydrocarbons, the $C_2$ hydrocarbons, the $C_3$ hydrocarbons, the $C_4$ hydrocarbons, and the $C_{5+}$ hydrocarbons;
    removing at least a portion of the $C_{3+}$ hydrocarbons from the first treated gas stream based on the contacting with the physical solvent and then with water to form a second treated gas stream; and
    liquefying at least a portion of the second treated gas stream.

2. The method of claim 1, wherein the second treated gas stream comprises water, and wherein the method further comprises:
    removing at least a portion of the water in the second treated gas stream prior to liquefying at least the portion of the second treated gas stream.

3. The method of claim 2, wherein removing at least the portion of the water in the second treated gas stream reduces the water in the second treated gas stream to at or below about 1 lb/MMscf.

4. The method of claim 2, wherein removing at least the portion of the water in the second treated gas stream occurs in a dehydration unit.

5. The method of claim 1, wherein the physical solvent comprises dimethylether of polyethylene glycol, ethylene carbonate, propylene carbonate, N-methylpyrrolidone, glycol ethers, ethers of polyglycols, N-substituted morpholine, or any combination thereof.

6. The method of claim 1, wherein contacting the first treated gas stream with the physical solvent and contacting the feed gas stream with the acid gas removal solvent occurs at a pressure between about 900 psig and about 1500 psig.

7. The method of claim 1, wherein contacting the first treated gas stream with the physical solvent removes between about 20% and about 40% of $C_5$ hydrocarbons in the first treated gas stream being contacted with the physical solvent.

8. The method of claim 1, wherein contacting the first treated gas stream with the physical solvent removes between about 30% and 70% of $C_6$ hydrocarbons in the first treated gas stream being contacted with the physical solvent.

9. The method of claim 1, wherein contacting the first treated gas stream with the physical solvent removes between about 90% and 95% of $C_{7+}$ hydrocarbons in the first treated gas stream being contacted with the physical solvent.

10. The method of claim 1, wherein the $C_{5+}$ hydrocarbons in the first treated gas stream comprise aromatic hydrocarbons, wherein contacting the first treated gas stream with the physical solvent removes greater than 90% of the aromatic hydrocarbons in the feed gas stream being contacted with the physical solvent.

11. The method of claim 1, wherein contacting the first treated gas stream with the physical solvent and then with water is performed in an absorber of the physical solvent unit.

12. The method of claim 11, further comprising:
    adding makeup water to the absorber.

13. A method of processing a feed gas stream, the method comprising:
    contacting, in an acid gas removal unit configured for removal of acid gases from the feed gas stream, the feed gas stream with an acid gas removal solvent, wherein the feed gas stream comprises $C_1$ hydrocarbons, $C_2$ hydrocarbons, $C_3$ hydrocarbons, $C_4$ hydrocarbons, $C_{5+}$ hydrocarbons, and acid gas components;
    removing at least a portion of the acid gas components from the feed gas stream based on the contacting with the acid gas removal solvent to form a first treated gas stream;
    contacting, in a physical solvent unit configured for removal of $C_{3+}$ hydrocarbons from the first treated gas stream, the first treated gas stream with a physical solvent;
    removing at least a portion of the $C_{3+}$ hydrocarbons based on the contacting the first treated gas stream with the physical solvent to produce a second treated gas stream and a rich solvent stream, wherein the second treated gas stream comprises the $C_1$ hydrocarbons and the $C_2$ hydrocarbons, wherein the rich solvent stream comprises the physical solvent, the $C_3$ hydrocarbons, the $C_4$ hydrocarbons, and the $C_{5+}$ hydrocarbons; and separating, in the physical solvent unit, the rich solvent stream into a flashed vapor stream and a flashed liquid stream;

stripping, in the physical solvent unit, the flashed liquid stream to form a stripper overhead stream and a stripper bottom stream;

extracting, in the physical solvent unit, a first portion of the stripper bottom stream with water as an extraction agent to produce a hydrocarbon overhead stream and a return solvent stream; and liquefying at least a portion of the second treated gas stream.

14. The method of claim 13, further comprising:
combining the return solvent stream with a second portion of the stripper bottom stream to form an absorber recycle solvent stream.

15. The method of claim 13, wherein extracting the first portion of the stripper bottom stream with water occurs in an extraction column, and wherein the water used in the extracting step is added to the extraction column.

16. The method of claim 13, further comprising:
separating the stripper overhead stream into a waste gas stream and a second flashed liquid stream, wherein the waste gas stream comprises hydrogen sulfide, carbon dioxide, hydrocarbons, and water, wherein the second flashed liquid stream comprises water.

17. The method of claim 13, wherein removing at least a portion of the $C_{3+}$ hydrocarbons is further based on:
separating an absorber overhead stream into the second treated gas stream and a flash drum bottom stream; and
stripping the flash drum bottom stream.

18. The method of claim 17, further comprising:
combining the flash drum bottom stream and the flashed liquid stream to form a stripper column feed stream; and
feeding the stripper column feed stream to a stripper column.

19. The method of claim 18, further comprising:
heating the flashed liquid stream using the stripper bottom stream prior to combining the flash drum bottom stream and the flashed liquid stream.

20. The method of claim 13, wherein the second treated gas stream further comprises water, and wherein the method further comprises:
removing at least a portion of the water in the second treated gas stream prior to liquefying at least the portion of the second treated gas stream.

* * * * *